March 17, 1964  H. J. McCULLOUGH  3,125,463
AUTOMATIC REELING MACHINE FOR MILLED RUBBER STOCK STRIP
Filed Dec. 26, 1961  6 Sheets-Sheet 1

INVENTOR.
HARRY McCULLOUGH
BY
ATTYS

March 17, 1964   H. J. McCULLOUGH   3,125,463
AUTOMATIC REELING MACHINE FOR MILLED RUBBER STOCK STRIP
Filed Dec. 26, 1961   6 Sheets-Sheet 2

INVENTOR.
HARRY McCULLOUGH
BY
ATTY'S

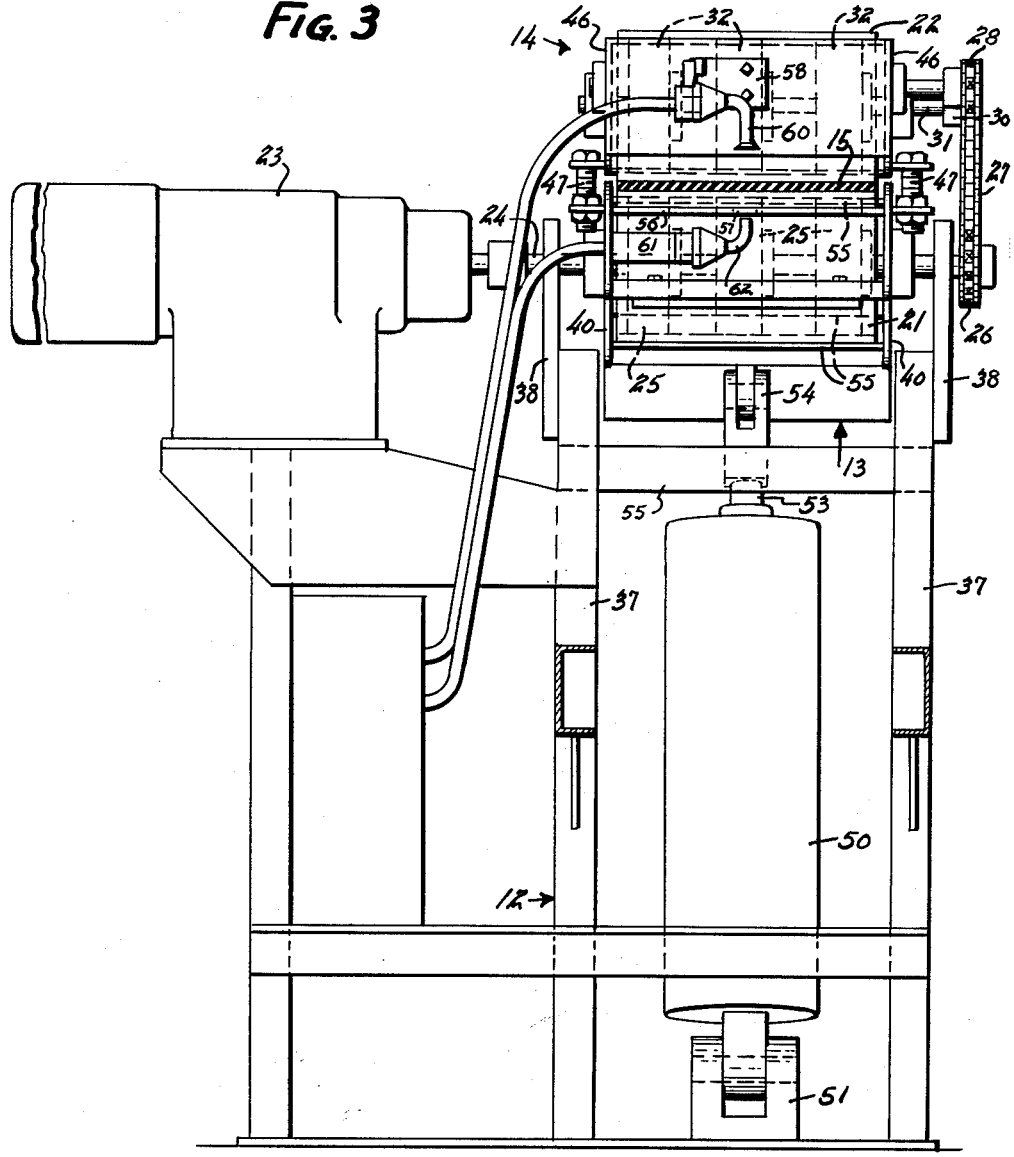

March 17, 1964  H. J. McCULLOUGH  3,125,463
AUTOMATIC REELING MACHINE FOR MILLED RUBBER STOCK STRIP
Filed Dec. 26, 1961  6 Sheets-Sheet 4
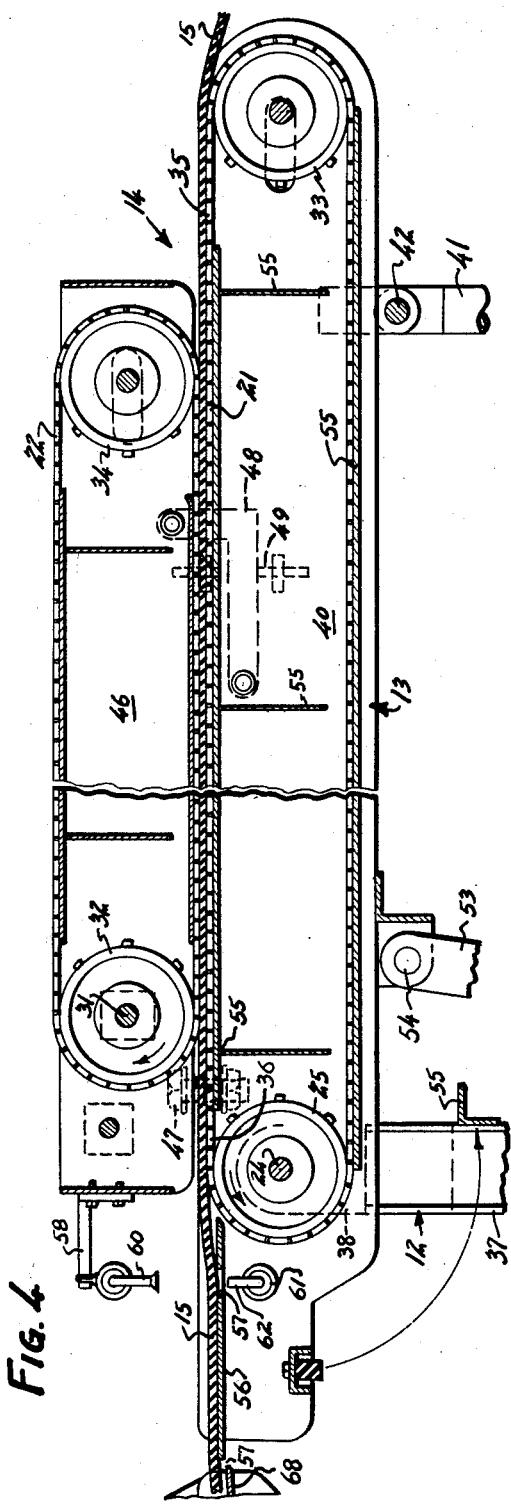
INVENTOR.
HARRY McCULLOUGH
BY A Dunham Owen
Robert E Wickersham
ATTY'S March 17, 1964 H. J. McCULLOUGH 3,125,463
AUTOMATIC REELING MACHINE FOR MILLED RUBBER STOCK STRIP
Filed Dec. 26, 1961 6 Sheets-Sheet 5
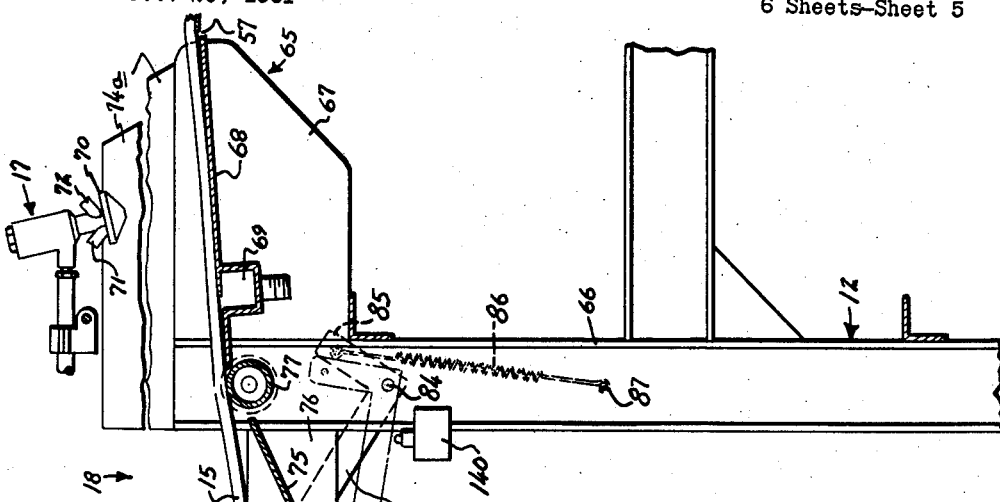
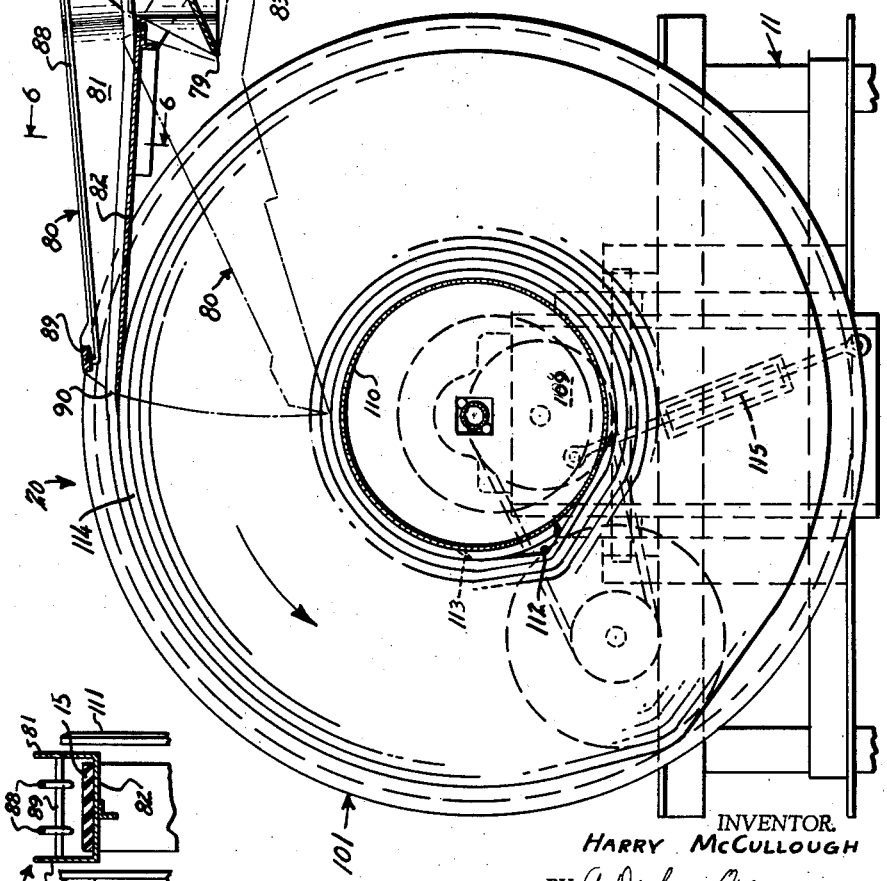
INVENTOR.
HARRY McCULLOUGH
BY
ATTY'S INVENTOR.
HARRY McCULLOUGH

United States Patent Office 3,125,463
Patented Mar. 17, 1964

3,125,463
AUTOMATIC REELING MACHINE FOR MILLED RUBBER STOCK STRIP
Harry J. McCullough, Van Wert, Ohio, assignor to Federal-Mogul-Bower Bearings, Inc., Detroit, Mich., a corporation of Michigan
Filed Dec. 26, 1961, Ser. No. 161,945
10 Claims. (Cl. 118—2)

This invention relates to an apparatus for automatically reeling strips of natural or synthetic rubber that are taken directly from a rubber mill after compounding and before vulcanization.

When rubber is compounded in a mill, the result is normally a cylindrical sheet of substantially uniform thickness covering one of the mill rollers. While the rubber can be removed as a flat sheet by cutting it longitudinally, such sheets are often very awkward to handle or to store. Therefore, it is often much more convenient to employ a knife or a pair of knives, as well-known in the industry, to make a generally helical cut while the roller rotates, and while the roller and knives move axially relative to each other, resulting in a long narrow strip of substantially constant thickness and substantially constant width. Such strips may be fed directly into a processing machine, but in many instances direct feeding has serious disadvantages.

For example, when strips of oil-resistant synthetic elastomer are used in the manufacture of radial-lip shaft seals, each strip is fed into an extruder which extrudes it in the form of a cylindrical tube from which rings are sliced off for use in molds. Many different extruders or extruding dies are used in order to form different diameter rings for different sizes of shaft seals. It is very inefficient to operate an entire rubber mill only for one particular extruder, and only when that extruder is in use, or to use one extruder exclusively with one mill. It is much more efficient to make many batches of a particular compound type of rubber strip on a mill until a suitable stock of that strip is on hand; with several types of strip in stock, the proper type may be fed into each extruder whenever desired. Such strips can best be stored by winding them onto reels so that full advantage can be taken of economic load factors and the various machines can be used at their greatest efficiency. Similar reasons for reeling strips and storing them apply to other manufacturing processes.

Heretofore, the strips from rubber mills have been reeled by hand, with some mechanical help. The present invention makes the reeling operation automatic.

Before reeling up a strip on itself, the strip has to be coated with something that will prevent it from sticking to itself. Heretofore, the normal practice has been to lead the strip through cold water to cool it off before reeling it by hand. There are disadvantages to such a rapid cooling operation because the more times the rubber is heated and cooled the more liable it becomes to acquire undesirable properties; therefore, it is better to be able to handle the rubber hot as long as possible, and to permit it to cool more gradually and more naturally, rather than by immersion in cold liquid.

The present invention relates to a machine which automatically guides the strip after it has been cut by the knife, sprays it with a suitable material for keeping it from sticking to itself, and then automatically reels it while it is still hot. The operator need not watch the material at all during any of this operation; he merely has to press a button and the machine will do the rest. Moreover, after each reel is completed the machine automatically stops itself.

Other objects and advantages of the invention will appear from the following description of a preferred form of the invention.

In the drawings:

FIG. 3 is an enlarged view in elevation and partly in section taken along the line 3—3 in FIG. 1.

FIG. 4 is an enlarged fragmentary view in elevation and in section taken along the line 4—4 in FIG. 2.

Figure 2:
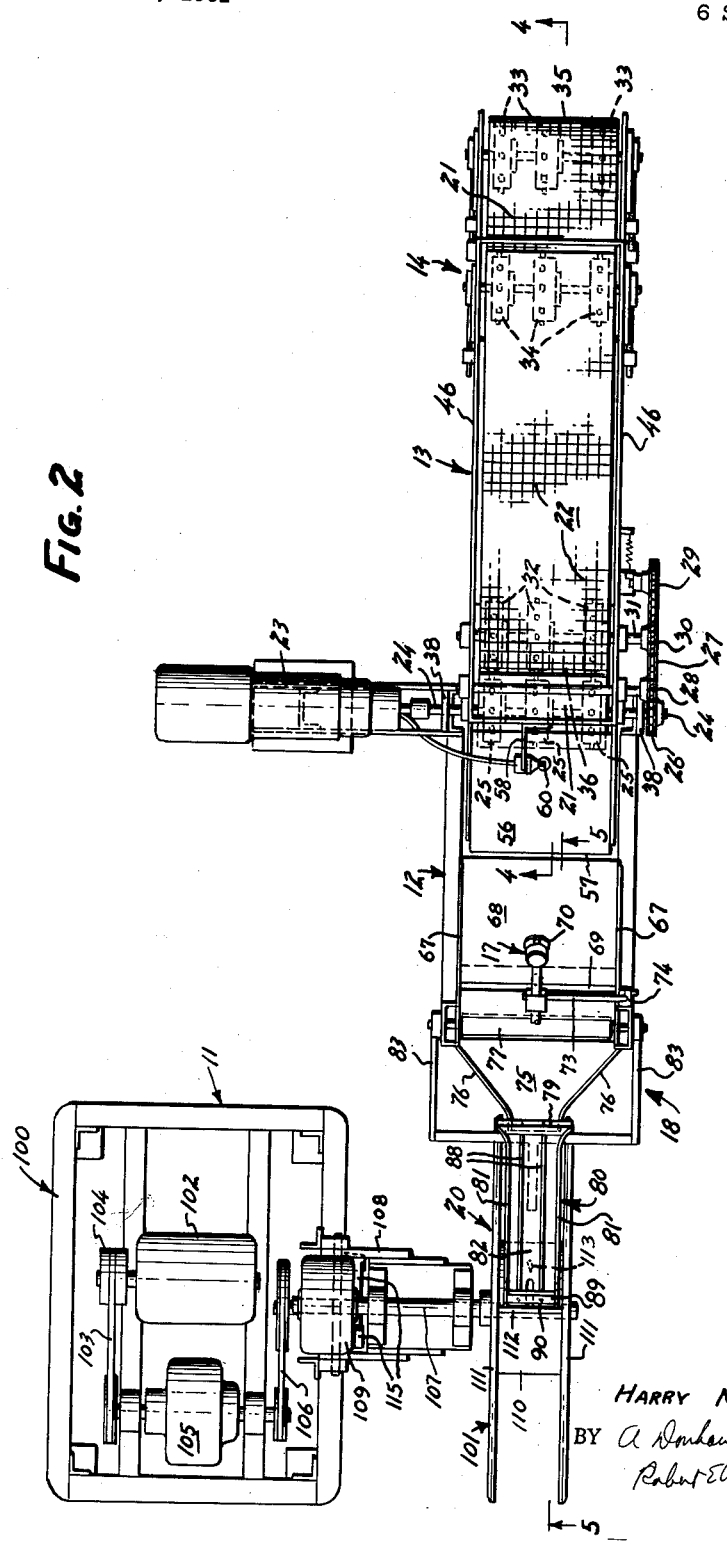
FIG. 2 is a top plan view of the machine of FIG. 1.

FIG. 5 is an enlarged fragmentary view in elevation and in section taken along the line 5—5 in FIG. 2. Broken lines indicate the position of some parts at the commencement of reeling, while a later position of these parts is shown in solid lines. Also, the spray-gun support is broken and the gun brought down into view.

FIG. 6 is a fragmentary view in elevation and in section taken along the line 6—6 in FIG. 5.

FIG. 7 is a fragmentary top plan view on an enlarged scale of a portion of the reel.

FIG. 8 is a fragmentary view in elevation and in section taken along the line 8—8 in FIG. 7.

FIG. 9 is a view similar to FIG. 8 after a small amount of rotation of the reel, showing what happens when the rubber strip is fed into the reel.

Figure 10:
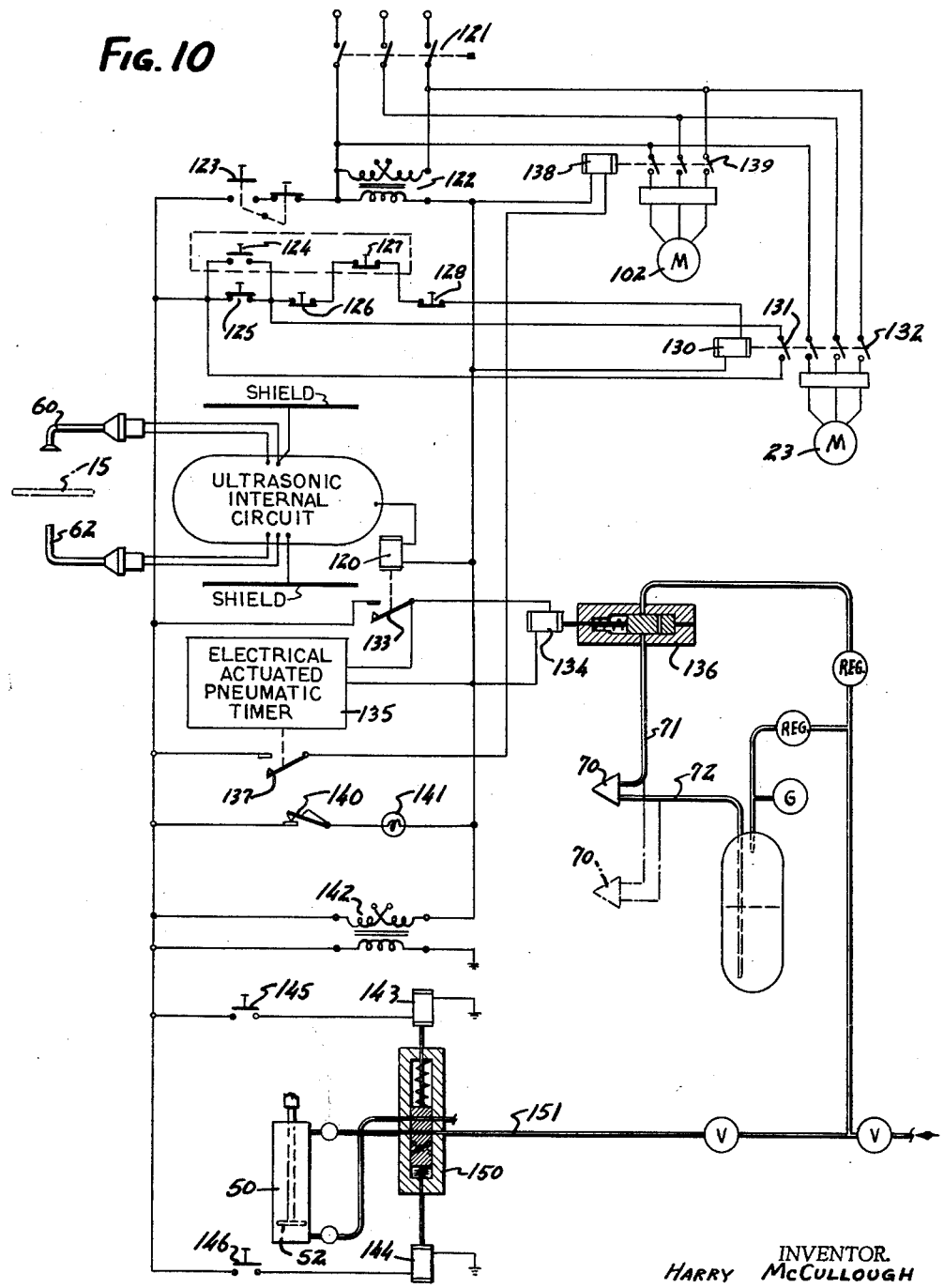

FIG. 10 is a circuit diagram of the electrical and hydraulic circuits used in the apparatus.

Figure 1:
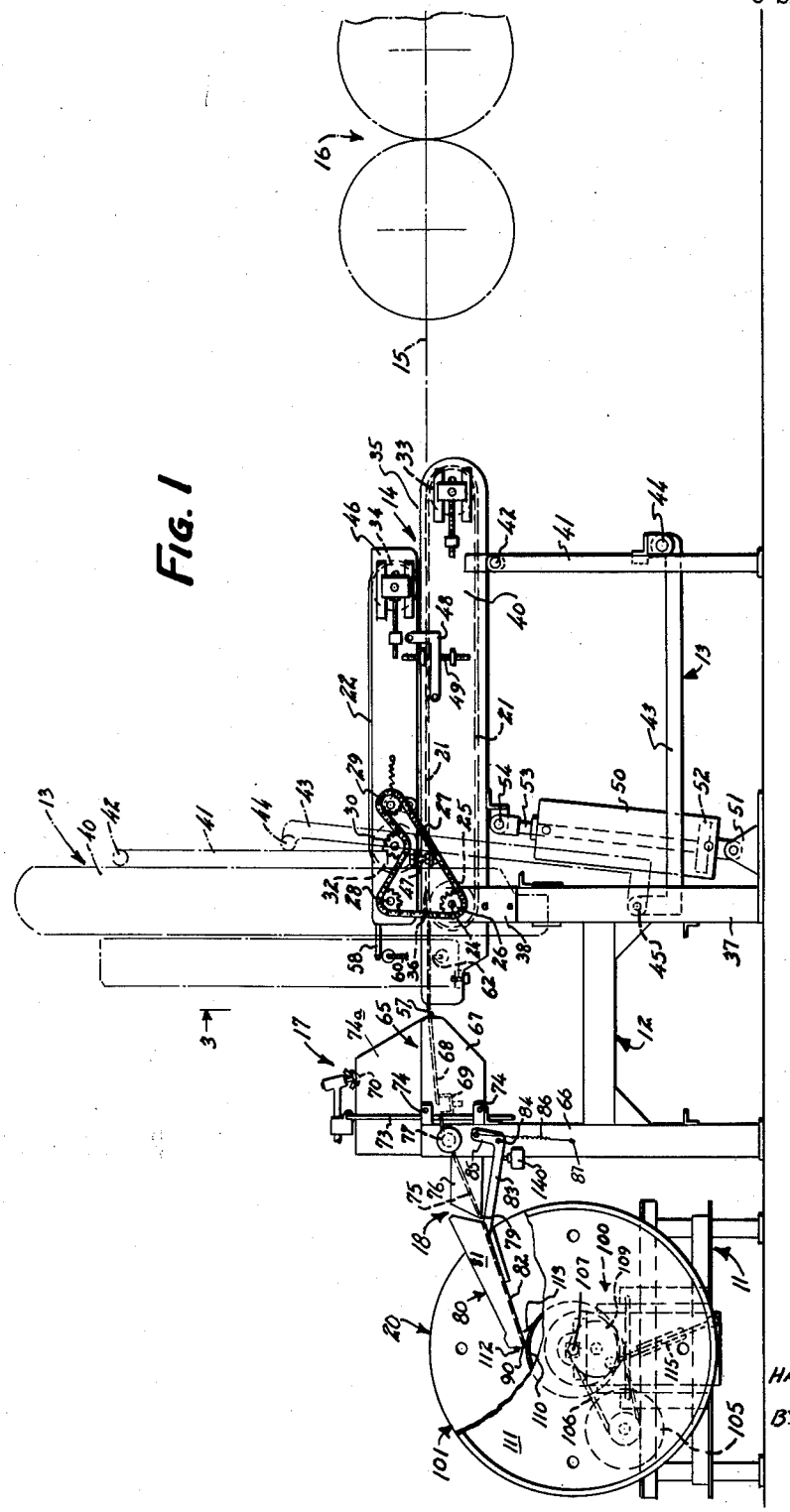
FIG. 1 is a view in side elevation of a machine embodying the principles of the invention shown in operating position. Broken lines indicate the position of certain frame elements when they are retracted to a non-operating position that enables the mill operator to use the area adjacent the mill during the milling operation.

As shown in FIGS. 1 and 2, the apparatus of this invention may have a frame 11 for the reeling portion of the apparatus, and a frame 12 for the feeding portion of the apparatus. The frame 12 pivotally supports an extension frame 13 which can be lowered into its normal operation position shown in solid lines in FIG. 1, or can be raised into a vertical position indicated in broken lines in FIG. 1. The frame 13 supports a strip-receiving-and-advancing mechanism 14 which takes a strip 15 from a rubber mill 16 and propels it to the frame 12. The frame 12 also supports a spraying mechanism 17 for treating the elastomeric strip 15 so that it will not stick to itself later on, and from there a guide means or mechanism 18 leads the strip 15 to a reeling mechanism 20. There, the strip 15 is automatically reeled at the rate at which it is fed until the reel is completed; then the reeling operation and the feeding operation are automatically stopped.

THE STRIP-RECEIVING-AND-ADVANCING MECHANISM 14 (FIGS. 1-4)

In the mechanism 14, the strip 15 of rubber stock is fed between two belts 21 and 22, both supported by the frame 13 and adjustable relative to each other. The belts 21 and 22 are much wider than the strip 15 and are not solid but are preferably open wire mesh so that the rubber strip 15 is air-cooled while it is being advanced. A motor 23 drives a shaft 24 carrying a set of sprocket wheels 25 that engage the mesh to advance the belt 21. The shaft 24 also carries a sprocket wheel 26 that drives a chain 27. The chain 27, engaging a sprocket wheel 28 on a fixed axis and an adjustable takeup sprocket wheel 29, drives a sprocket wheel 30 on a cam shaft 31 carrying a set of sprocket wheels 32 that engage and drive the upper wire mesh belt 22 at the same speed as the lower wire mesh belt 21.

At the opposite ends of the belts 21 and 22 are idler and take-up sprockets 33 and 34 that keep the belts 21 and 22 taut. The lower belt 21 is longer than the upper belt 22 and extends beyond it at both ends. On the inlet end this provides an inlet portion 35 that enables the stock strip 15 to be fed more easily in between the belts 21 and 22. There is also an outlet portion 36. The motor 23 is carried by the stationary frame 12 (FIG. 3) which has a pair of legs 37 having upwardly extending arms 38 in which the shaft 24 is journaled.

Pivoted around the shaft 24 are a pair of side plates 40 forming part of the frame 13. At the opposite end of the plates 40 from the upright legs 37 are a pair of legs 41 connected to the plates 40 by pivots 42. Lower supporting members 43 of the frame 13 are connected to the legs 41 by pivots 44, and to the upright legs 37 by pivots 45. Side plates 46 along the edges of the upper belt 22 carry the shaft 31 and the shafts for the sprockets 28, 29, and 34. A pair of adjustment bolts 47 (see FIG. 3) support one end of the plates 46 above the plates 40 at a desired height, while cranks 48 and adjustment screw devices 49 enable adjustment of other end of the upper plates 46 relative to the lower plates 40 and so make it possible to raise and lower the belt 22 relative to the upper belt 21 or to widen the inlet end thereof.

Raising and lowering of the frame 13 is accomplished by means of pneumatic apparatus including a cylinder 50 pivotally supported on a bracket 51 of the frame 12 at its lower end and having a piston 52 with a rod 53 extending out and connected to the frame 13 at a pivot 54. Extension of the piston causes the frame 13 to be pivoted around the shaft 24 and pivots 45 into the position shown in broken lines in FIG. 1.

The plates 40 are joined by cross-members 55 of various types, and there is also a cross-member 56 beyond the sprocket wheels 25 which supports the strip 15 as it comes off the outlet portion 36 of the lower belt 21. This outlet portion 36 has a slit opening 57 therethrough. Above the slit 57 the plates 46 support a bracket 58 that carries an ultrasonic receiver 60. Below the slit 57 the plates 40 support a cross bar 61 that supports an ultrasonic transmitter 62. Because of the slit 57 there is normally no interference of the ultrasonic signal between the transmitter 62 and the receiver 60. However, when the strip 15 crosses over the slit 57 (see FIG. 4), it interrupts the ultrasonic beam and starts the reeling mechanism through an electrical circuit to be described later.

THE SPRAYING STATION (FIGS. 1, 2 AND 5)

After passing beyond the slit 57, the strip stock 15 moves over to a stationary portion 65 of the frame 12 below the spraying mechanism 17. The frame 12 has a pair of columns 66 to which are secured a pair of side plates 67 between which is a downwardly inclined support plate 68 having a well 69.

The spray mechanism 17 may employ a conventional air-type gun 70 fed from hoses 71 and 72 in the normal manner. As will soon be seen, the gun 70 is actuated on and off by the ultrasonic receiver 60, so that the fluid sprayed from the gun 70 will not be wasted. The gun 70 may be supported on a suitable rod 73 which is adjustably mounted in brackets 74 on one of the plates 67 for varying the height between the gun 70 and the strip 15 to be sprayed. This enables adjustment of the width of the spray pattern. The receptacle or well 69 receives the spray that runs off or fails to strike the strip 15 and makes it possible to reuse the collected liquid. A shield 74a on each side of the gun 70 extends up high enough so that all the fluid is used or collected.

THE GUIDE MEANS 18 (FIGS. 1, 2, AND 5)

From the spraying station 17, the strip 15 passes to the guide means 18. A support plate 75 is mounted between two side plates 76 that are pivotally mounted around a stationary shaft 77 carried by the upper end of the columns 66. The converging side guides 76 center the strip 15 and guide it into a chute 80. The chute 80 is pivotally mounted to the frame 12 so as to move up as the reeling increases the diameter of the reeled stock. The chute 80 has a pair of side plates 81, a bottom plate 82, and a pair of arms 83 pivoted to a pivot shaft 84 extending between the columns 66. The lower end 79 of the support plate 75 rides on top of the arms 83. An extension member 85 on at least one arm 83 is secured to one end of a spring 86. The other end of the spring 86 is secured to an anchor 87 on the column 66. An upper guide 88 preferably largely open, keeps the strip 15 from getting out of the chute 80. The guide 88 converges toward the bottom plate 82, having an outlet guide 89 near an outlet 90 from the chute 80. The strip 15 passes down the chute 80, out through the outlet 90, and into the reeling mechanism 20.

THE REELING MECHANISM 20 (FIGS. 1, 2, AND 5–9)

The reeling mechanism 20 incorporates a drive assembly unit 100 and a reel 101. The drive assembly unit 100 is supported by the frame 11 and includes a motor 102 which drives a belt 103 through a variable pulley 104. The belt 103 drives a fluid coupling unit 105 which, through a pulley 106 drives a reel supporting shaft 107. The shaft 107 is mounted upon a pivoted frame 108, so that an overhead crane may be used to remove the filled reel 101 and so that any uncontrolled movement of the crane will not then lift the unit from the floor but will instead tend to tilt the reel shaft 107 freely, thus helping to prevent accidents that might cause misalignments. A shaft mounted gear reducer 109 is prevented from rotating around the shaft by an arm or rod 115; adjustment of the length of the rod 115 tightens or loosens the driving belt 106.

The reel 101 is provided with a cylindrical drum 110 around which the strip 15 is wound between disc side walls 111. When the chute 80 deposits the free end of the strip 15 on the drum 110, it passes beneath a cross-rod 112, (see FIGS. 7 and 8) which locks the strip to the drum 110 as the drum rotates. A short distance back of the rod 112 is a needle 113 which as the drum 110 rotates, follows the rod 112 and a fraction of a second after the drum 110 starts rotating stabs into the rubber strip 15 (see FIG. 9) and retains it against any possible displacement. A slot 91 in the member 82 makes this possible. From then on the strip 15 is wound around the drum 110, the sides 111 holding it in line. As the diameter of the reel increases, the pivoted chute 80 moves upward riding on the reeled portion 114 of the strip (FIG. 5). The spring 86 acts as a counterbalance to hold the chute 80 in an elevated position during the loading and unloading of the reel 101. As will be explained in connection with the circuit, the rotation of the reel 101 is initiated by the ultrasonic device through a time-delay mechanism that gives the strip 15 time to pass under the rod 112 just as the reel 101 starts rotating. The rotation of the reel 101 is stopped automatically following the movement of the last of that particular strip 15 past the slit 57, the tail end of the strip 15 being wound around the drum 110 as the reel 101 coasts to its stop, which takes about one revolution.

THE ELECTRICAL CIRCUITRY (FIG. 10)

The ultrasonic device is a commercial one that can be bought on the market and includes the transmitter 62, the receiver 60, and a relay mechanism 120 actuated by interruption of the ultrasonic sound waves passing between the transmitter 62 and the receiver 60. As shown in FIG. 10, 3-phase, 440-volt electric current is preferably used and it operates the two motors 23 and 102. A ganged three-pole master switch 121 is used for turning on and off the main current. The 3-phase, 440-volt current goes to a transformer 122 which provides a single phase, 115-volt current. The circuit here has been drawn in the across-the-line form to make its operation simpler and clearer.

A selector switch 123 on the conveyor frame enables the 115-volt current to be cut on at the beginning of the day's operation, and off at the end of the day's operation. It also enables cutoff at any time of the entire device should that become desirable. A push-button 124 on the mill frame, and a push-button 125 on the conveyor frame are provided to initiate operation of the device. Safety switches 126 and 127 and 128 are on the mill frame and on the conveyor frame enabling the operator to cut off the motor 23 at any time. These switches 126, 127, and 128 are all in series with a relay 130 that closes contacts 131 and ganged switch 132 when energized. The switch 131 is in parallel with the push-button switches 124 and 125 and provides the holding contacts so that the relay 130 is a holding relay once energized, until killed, or until the circuit is otherwise broken. The switch 132 supplies the 3-phase, 440-volt current to the motor 23 so long as the relay 130 is energized.

As stated before, the ultrasonic relay 120 is actuated when and only when the rubber strip 15 crosses the slit 57 to interrupt the ultrasonic beam between the transmitter 62 and the receiver 60. Actuation of the relay 120 closes a switch 133 which is in series with a sprayer solenoid 134 and an electrically actuated two-way pneumatic timer 135, these two being in parallel with each other. The sprayer solenoid 134 opens a valve 136 for the spraying gun 70 as soon as the relay 120 has been closed by interruption of the ultrasonic beam to start the spraying at once so that even the beginning of the strip 15 is sprayed. The pneumatic timer 135 starts a time delay cycle running, and when the period has run, closes a switch 137 controlling a relay 138 which closes a ganged switch 139 for the reel motor 102 when energized and thereby starts the reel motor 102 operating. The time delay is set to be just long enough for the strip 15 to reach the reel drum 110 and get under the rod 112. When the reel 101 makes one complete turn, the added thickness of the reeled strip opens a limit switch 140 on the frame 86. The switch 140 is in series with a warning light 141. If the light 141 does not go off, then the operator knows that something is wrong and that the strip 15 is not being properly reeled.

The 115-volt line is connected to a transformer 142 that is used to reduce the 115-volt down to an 8-volt current, which is used for operating two solenoids 143 and 144 which control the passage of compressed air to the cylinder 50 to move the conveyor frame 13 up or down. There are momentary switches 145 and 146 on the mill frame for manually actuating the solenoids 143, 144 so that the operator can simply push the switch 145 to get the conveyor frame 13 to move up or press the switch 146 to get the conveyor frame 13 to move down. The pnuematic circuit as shown also in FIG. 10 includes a valve 150 operated by the two solenoids 143, 144 to move in its two directions. The cylinder 50 and piston 52, already described, are operated by a pneumatic circuit 151 controlled by the valve 150.

*Operation*

When the operator desires to use the device he can press the switch 146 to lower the conveyor frame 13 into position. He closes the switch 123 and presses a button 124 or 125 to start the motor 23. He then starts the knife-cutting operation of the prior art for the mill to send the strip 15 on to the lower wire mesh belt 21. It automatically passes between the lower and upper conveyor screens or belts 21 and 22 and goes over on the other side to the slot 57 where it interrupts the ultrasonic beam between the transmitter 62 and the receiver 60. This actuates the relay 120, closes the switch 133 and energizes the solenoid 134 to open the valve 136 and turn on the spray gun 70, which then sprays the rubber strip 15 already partially cooled, coating it with material that will prevent it from sticking to itself as it is wound around the reel 101. The strip 15 goes down the chute 80, feeds onto the reel 101 and under the rod 112. At this instant the device has been so set that the time delay relay 135 now turns on the motor 102 for the reel 101 and starts winding the strip 15 around the drum 110. A moment after winding starts the needle 113 punctures the strip 15. After one circuit of the reel 101, the reeled strip lifts the chute 80 around its pivot 84 and opens the switch 140, turning off the light 141. As the reel 101 winds around and around, the feed chute 80 is gradually lifted higher and higher by the reeled strip 15 on which it is riding. When the last of the strip 15 passes beyond the slit 57, the ultrasonic relay 120 is de-energized and the switch 133 opens, de-energizing the solenoid 134 and cutting off the spray gun 70 and turning off the motor 102, so that the reel 101 coasts to a stop after just time for the tail end of the strip 15 to go down the chute 80 onto the reeled strip. This loaded reel 101 may then be stored, if desired, a new one loaded and another strip from another mill, or from the same mill, may be reeled, if that is desired, and thus adequate storage of strip stock in reel form may be achieved with ease.

The speeds of the belts 21 and 22 and of the reel 101 are adjusted to the speed of the mill rolls 16 by use of the variable speed devices, so that once set, further adjustment of these speeds is unnecessary for day-to-day operation. The only tension on the rubber strip 15 is that caused by the reel drive, and is calculated to lie below that critical for the rubber.

To those skilled in the art to which this invention relates, many additional changes in construction and widely differing embodiments of the invention will suggest themselves without departing from the spirit and scope of the invention as defined in the claims.

What is claimed is:

1. A reeling device for a hot rubber strip, including in combination:
   conveying means for said strip,
   control means having sensing means for detecting the presence and absence of said strip at a predetermined point on said conveying means,
   means actuated by said control means for spraying said strip with material to prevent it from sticking to itself later,
   a reel having end-receiving means,
   means for guiding the sprayed said strip onto said reel with the end of the strip going to said end-receiving means,
   means to drive said reel, and
   time-delay means actuated by said control means upon said strip passing said point for starting said means to drive said reel when said strip end reaches said end-receiving means
   said control means stopping said means to drive said reel when said strip has been fully wound around said reel.

2. The device of claim 1, wherein said conveying means comprises a pair of loosely woven wire mesh belts that enable the heat to dissipate from the belt.

3. The device of claim 1 wherein the means for spraying includes means for collecting excess sprayed liquid and for returning it to said means for spraying.

4. The device of claim 1 wherein said reel has a needle located behind said end-receiving means, for piercing said belt after said reel has rotated a short distance.

5. A reeling device for a hot rubber strip, including in combination.
   a pair of largely open endless belts with facing runs to propel the strip between them,
   sensing means responsive to the presence of said strip at a place in the path of the strip as it leaves said belts,
   means actuated by said sensing means when said strip passes said sensing means for spraying said strip with material to keep it from sticking to itself when wound,
   a reel having a drum and flanged side walls and end-receiving means adjacent said drum, means for guiding said strip onto said drum and into said end-receiving means, means to drive said real and, time-delay means actuated by said sensing means when said strip passes said sensing means for starting said means to drive said reel when said strip enters said end-receiving means, said sensing means stopping said means to drive said reel when all said strip has been reeled.

6. The device of claim 5 wherein said means for guiding said strip onto said drum includes a pivoted chute that rides freely on the drum and on material wound thereon.

7. The device of claim 6 wherein said means for guiding is counterbalanced by a spring to stay up away from said drum while a reel is being placed on or taken from said machine.

8. The device of claim 5 wherein said sensing means comprises an ultrasonic device having a transmitter and a receiver on opposite sides of the path of the strip between which the strip passes and a relay actuated by such passage.

9. A reeling device for a hot rubber strip coming from a rubber compounding mill, including in combination:

a pair of endless belts with facing runs to propel the strip between them, said belts being open wire mesh, an ultrasonic transmitter and receiver on opposite sides of the path of the strip as it leaves said belts, means actuated said transmitter and receiver when said strip passes between them for spraying said strip with material that prevents the strip from sticking to itself when reeled, a reel having a drum and flanged side walls and a cross-bar spaced from said drum and a needle extending out from said drum adjacent said cross-bar, means for guiding said strip onto said drum and beneath said cross-bar, means to drive said drum, and time-delay means actuated by said transmitter and receiver when said strip passes between them for starting said means to drive said drum when said strip has its end pass between said cross-bar and said drum, said transmitter and receiver stopping said means to drive said drum when the material has been fully wound thereon, thereby vacating the span between said transmitter and receiver.

10. A reeling device for a hot rubber strip, including in combination:

a main frame, a sub-frame pivoted to said main frame, conveying means for said strip on said sub-frame, means for raising and lowering said sub-frame from a horizontal operating position to a vertical non-operating position, sensing means on said main frame sensitive to said strip passing a predetermined point on said conveying means, means actuated by said sensing means for spraying said strip with material to prevent it from sticking to itself later, a reel rotatably mounted on said main frame having end-receiving means, means pivotally mounted on said main frame for guiding said strip onto said reel and its end to said end-receiving means, means on said main frame to drive said reel and, time-delay means on said main frame actuated by said sensing means upon said strip passing said point for starting said means to drive said reel when said strip end reaches said end-receiving means, said sensing means upon said strip having passed said point stopping said means to drive said reel, said strip being fully wound around said reel by said reel coasting to a stop.

No references cited.